United States Patent
Yu et al.

(10) Patent No.: US 8,508,535 B1
(45) Date of Patent: Aug. 13, 2013

(54) SYSTEMS AND METHODS FOR LOCKING INVERSE KINEMATIC (IK) OBJECTS TO A SURFACE OBJECT

(75) Inventors: Meng Yu, San Francisco, CA (US); Chen Shen, Emeryville, CA (US); William Reeves, Berkeley, CA (US); Timothy S. Milliron, Menlo Park, CA (US)

(73) Assignee: Pixar, Emeryville, CA (US)

( * ) Notice: Subject to any disclaimer, the term of this patent is extended or adjusted under 35 U.S.C. 154(b) by 824 days.

(21) Appl. No.: 12/481,446

(22) Filed: Jun. 9, 2009

Related U.S. Application Data

(63) Continuation-in-part of application No. 11/759,790, filed on Jun. 7, 2007.

(60) Provisional application No. 60/812,300, filed on Jun. 9, 2006.

(51) Int. Cl.
*G06T 13/00* (2011.01)

(52) U.S. Cl.
USPC ........... 345/473; 345/419; 345/474; 345/103; 345/154

(58) Field of Classification Search
USPC ......... 345/419, 473, 474, 103, 154; 382/103, 382/154
See application file for complete search history.

(56) References Cited

U.S. PATENT DOCUMENTS

| | | | |
|---|---|---|---|
| 5,755,620 A | 5/1998 | Yamamoto et al. | |
| 6,307,554 B1 | 10/2001 | Arai et al. | |
| 6,441,816 B1 | 8/2002 | Nguyen et al. | |
| 6,700,586 B1 * | 3/2004 | Demers | 345/588 |
| 6,791,549 B2 | 9/2004 | Hubrecht et al. | |
| 6,798,415 B2 | 9/2004 | Lake et al. | |
| 7,070,277 B2 * | 7/2006 | Trumbull | 352/243 |
| 7,154,507 B1 | 12/2006 | Moreton et al. | |
| 7,206,827 B2 * | 4/2007 | Viswanath et al. | 709/220 |
| 7,227,526 B2 * | 6/2007 | Hildreth et al. | 345/156 |
| 7,545,378 B2 | 6/2009 | Russ et al. | |
| 7,898,522 B2 * | 3/2011 | Hildreth et al. | 345/156 |
| 7,928,985 B2 * | 4/2011 | Goldfarb | 345/473 |
| 8,095,200 B2 * | 1/2012 | Quaid, III | 600/407 |
| 2002/0135591 A1 | 9/2002 | Zhang | |
| 2005/0052714 A1 | 3/2005 | Klug et al. | |

(Continued)

OTHER PUBLICATIONS

"Beginners Guide Maya", Jun. 2005.*
Zhang et al. "Spacetime Faces: High Resolution Capture for Modeling and Animation", published 2004.*
Sumner et al. "Mesh-Based Inverse Kinematics". ACM 2005.*

(Continued)

*Primary Examiner* — Kimbinh T Nguyen
(74) *Attorney, Agent, or Firm* — Kilpatrick Townsend & Stockton LLP

(57) ABSTRACT

Systems and methods for positioning a component of an inverse kinematics (IK) controlled animated object relative to a surface object. To help users deal with foot-ground (or other object-object) interactions efficiently, a foot-ground locking system is provided as a preprocessor to an inverse kinematics (IK) controller to automatically pose the foot on the ground. The foot is first rotated to reach the maximal contact area with the ground, then translated to touch the ground, and finally deformed to conform more tightly to the ground. The system works properly with other foot shape deformations, such as toe, heel, and ball rotations. The foot-ground locking can be used either as an interactive tool to help animators identify where the ground is or as a batch postprocessing tool to clean up foot-ground contacts whenever the animation or ground environment is changed.

31 Claims, 6 Drawing Sheets

(56) References Cited

U.S. PATENT DOCUMENTS

| | | |
|---|---|---|
| 2005/0253843 A1 | 11/2005 | Losasso Petterson et al. |
| 2006/0139355 A1* | 6/2006 | Tak et al. .................. 345/473 |
| 2006/0221076 A1 | 10/2006 | Takahashi et al. |
| 2006/0250402 A1* | 11/2006 | Perlin ..................... 345/474 |
| 2009/0184967 A1* | 7/2009 | Kulas ..................... 345/473 |
| 2010/0137882 A1* | 6/2010 | Quaid, III ................ 606/130 |

OTHER PUBLICATIONS

Weyand "Mesh-Based Inverse Kinematics". Nov. 16, 2005.*

Milliron, T. et al., "Smart Cars: Driving the Characters in Cars," *SIGGRAPH*, Aug. 2006, 1 page.

Tecchia et al., "Visualizing Crowds in Real-Time," Computer Graphics Forum, 2002, vol. 21, No. 4, pp. 753-765, Blackwell Publishers, Malden, MA.

* cited by examiner

SYSTEMS AND METHODS FOR LOCKING INVERSE KINEMATIC (IK) OBJECTS TO A SURFACE OBJECT

CROSS-REFERENCES TO RELATED APPLICATIONS

The present application is a Continuation-in-Part of U.S. patent application Ser. No. 11/759,790 filed on Jun. 7, 2007 which claims the benefit and priority under 35 U.S.C. 119(e) from U.S. Provisional Application No. 60/812,300, filed on Jun. 9, 2006 entitled POSITIONING AN ANIMATED OBJECT USING A DEPTH MAP the entire contents of which are incorporated by reference for all purposes.

BACKGROUND

The present invention relates generally to computer animation and graphics, and more particularly to techniques for determining a position of a component of an inverse kinematics (IK) controlled animated object relative to a surface object and updating the state of the animated object based upon the determination.

Animation involves the generation of a series of still images that, when played back in quick succession, appear as continuously moving. In computer animation, a rendering process is used to generate a two-dimensional image of a three-dimensional scene from a given viewpoint. Animated sequences can be created by rendering a sequence of the rendered images of a scene as a scene is gradually changed over time. A great deal of effort has been devoted to making the rendered images and the resultant animation realistic.

Typically, animated objects do not need to know about the environment during an animation process. However, in certain situations, an animated object needs to know about its environment in order to be positioned appropriately with respect to the environment to increase the realism of the animation. For example, an IK controlled character with appendages such as feet being needs to know about the ground so that the feet are properly positioned on the ground when animated so as to provide a physically realistic look, e.g., not penetrating ground and not floating. The character also has to be able to react to changes in terrain of the ground. For example, the terrain changes may correspond to variations in height such as hills or depressions. These terrain changes may not be part of the ground surface representation but instead may be represented by displacement maps in the shader code or additional objects placed on the surface. This cannot be handled by conventional techniques that handle interactions between two surfaces and require that surface characteristics be part of environment surface.

Additionally, manually adjusting interactions between a character's feet or other appendages and a bumpy or uneven terrain adds a heavy layer of work to an animator's already labor-intensive process. Animators need to tweak the positions and orientations of the feet to make them conform to the ground precisely, neither floating above nor penetrating the ground. Determining foot contact can be difficult where the terrain is complex, e.g., with hills, stairs, rocks and other uneven surface features. Keeping feet on the ground generally is not a one-time task. Whenever the ground environment or animation is changed, animators have to readjust the foot. They find managing foot-ground contact to be a tedious job.

Therefore it is desirable to provide improved techniques that overcome the above and other problems.

BRIEF SUMMARY

Systems and methods are provided for positioning a component of an inverse kinematics (IK) controlled animated object relative to a surface object.

In certain aspects, to help animators deal with foot-ground interactions efficiently, a foot-ground locking system is provided as a preprocessor to an inverse kinematics (IK) controller to automatically pose the foot on the ground. The foot is first rotated to reach the maximal contact area with the ground, then translated to touch the ground, and finally deformed to conform more tightly to the ground. The system works properly with other foot shape deformations, such as toe, heel, and ball rotations. The foot-ground locking can be used either as an interactive tool to help animators identify where the ground is or as a batch postprocessing tool to clean up foot-ground contacts whenever the animation or ground environment is changed. It should be appreciated that the techniques provided herein are applicable to other object-to-object interactions, e.g., appendages or objects besides feet making contact with other objects.

According to one aspect, a computer implemented method is provided for positioning an inverse kinematics (IK) controlled object relative to a surface object. The surface object, in certain aspects, is represented by a depth map. The method typically includes receiving a specification of an IK object and a surface object, receiving a target pose of the IK object, the target pose having an IK goal for the IK object, and determining a position and/or an orientation of a component of the IK object relative to the surface object. The method also typically includes updating a state of the target pose of the IK object based on the step of determining, wherein the updated state of the target pose of the IK object is such that when used the IK component maintains a specified distance from the surface object within a specified tolerance. In certain aspects, receiving a specification of the surface object includes accessing a depth map representing the surface object and determining includes using the depth map to determine difference values between the surface object and one or more points of the component. In certain aspects, the method further includes modifying a position of the IK goal and/or modifying an orientation of the component of the IK object based on the updated state of the target pose, wherein the position of the IK goal and the orientation of the component of the IK object are modified such that the component lies on the surface of the surface object. In certain aspects, the state of the target pose includes values for one or more animation control variables, and wherein the values for the one or more animation control variables are stored or cached for later use.

In certain aspects, the IK controlled object is an animated object used in an animation system and the method might include rendering one or more images including the animated object and the surface object, wherein in the one or more images the IK component maintains the specified distance from the surface object within the specified tolerance. In certain aspects, the method includes using the updated state of the target pose in an image display system to display an image of the IK object.

According to another aspect, a computer readable medium is provided that stores code, which when executed by one or more processors, causes the one or more processors to position an inverse kinematics (IK) controlled object relative to a surface object. The stored code typically includes instructions to receive a specification of an IK object and a surface object, to receive a target pose of the IK object, the target pose having an IK goal for the IK object, and to determine a position and/or an orientation of a component of the IK object relative to the surface object. The stored code also typically includes instructions to update a state of the target pose of the IK object based on the determined position and/or orientation, wherein the updated state of the target pose of the IK object is such that when used the IK component maintains a specified distance from the surface object within a specified tolerance.

According to yet another aspect, a system for positioning an inverse kinematics (IK) controlled object relative to a surface object is provided. The system typically includes one or more processors, and a memory for storing code modules. Typically, when executed by the one or more processors, the code modules cause the one or more processors to receive a specification of an IK object and a surface object, to receive a target pose of the IK object, the target pose having an IK goal for the IK object, and to determine a position and/or an orientation of a component of the IK object relative to the surface object. When executed, the code modules also typically cause the one or more processors to update a state of the target pose of the IK object based on the determined position and/or orientation, wherein the updated state of the target pose of the IK object is such that when used the IK component maintains a specified distance from the surface object within a specified tolerance. In certain aspects, the system further includes a display module for displaying one or more images of the IK controlled object.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
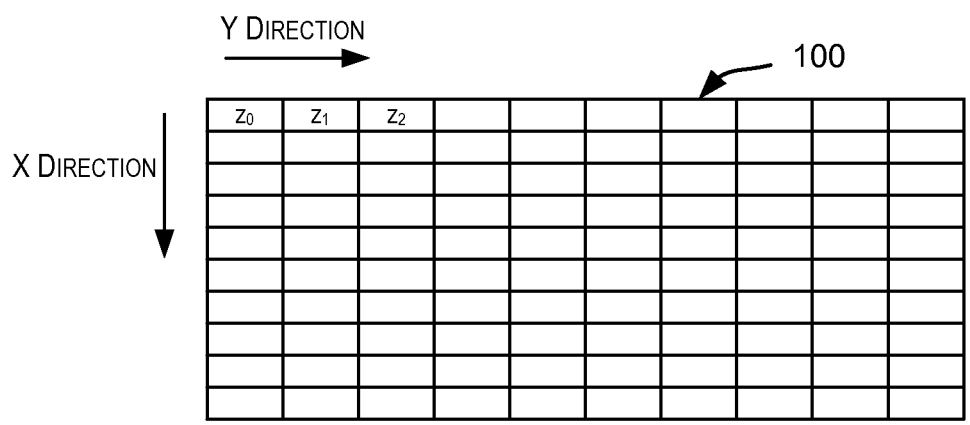
FIG. 1 illustrates a simplified two-dimensional array depth map storing depth or z-values

Embodiments of the present invention provide techniques for determining a position of a component of an IK controlled animated object relative to a surface object and updating the state of the animated object based upon the determination. A component of an IK controlled animated object will also be referred to herein as an IK component.

For inverse kinematics modeled objects, components (e.g., representing bones of a human character) are linked together in a hierarchical manner by means of parenting to form the movable joints in a body. For example, the thigh may be the parent object of a shin, the shin may be a parent of the foot, the foot may be the parent of toes, and so on. This linking establishes the hierarchy. When an object (like a thigh) is rotated, the child objects linked to it (shin, foot and toes) will follow along. This is the essential principle of hierarchical motion. And this method of working with a hierarchy is called forward kinematics. In forward kinematics, motion is inherited down the hierarchy from the parents to the children. In inverse kinematics (IK), on the other hand, motion is inherited up the hierarchy, from the extremities to the more proximal joints (closer to the body) which are their parents. This effectively allows an entire arm or leg to be posed by moving one object or point: an IK goal. As the IK goal is moved around, the extremities follow it, and the joints above it in the hierarchy readjust accordingly based on an IK solution algorithm. In order for the joints to readjust appropriately, constraints or "degrees of freedom" are typically assigned to the joints, so they don't bend beyond a realistic range of motion. Accordingly, as will be described herein, embodiments allow animators or other users to position an IK goal and effectively "lock" the IK component associated with that IK goal to a surface object, e.g., such that the IK component maintains a specified distance from the surface object within a specified tolerance amount. For example, an animator may desire to lock the foot of an animated character object to a ground or surface object. Thus, as an example, and according to certain embodiments, the animator may identify a desired target pose of an IK goal such as an ankle point or other point of a foot component and the system will automatically adjust the position and alignment of the IK component to match with or lock to a ground or surface object.

In certain aspects, a ground or surface object is represented by a depth map. A depth map is generally used for representing and storing depth information taken from a scene. A depth map (also typically referred to as a z-map or texture map or a shadow map) is generally a two-dimensional array wherein one dimension (e.g., rows) of the array corresponds to location along the X axis in an image and the other dimension (e.g., columns) corresponds to location along the Y axis in an image. The intersection of a row and a column represents an array element or a pixel. In a depth map, the array elements (pixels) store depth values (z values) for X and Y locations in the image.

FIG. 1 depicts a simplified two-dimensional array depth map 100 storing depth or z-values (e.g., Z0, Z1, Z2, etc.). The z-values may be computed from the perspective of a given light source or camera. As depicted in FIG. 1, the rows correspond to the X direction and the columns correspond to the Y direction. For each (x,y) index pair of the depth map, a z value is stored that specifies the depth at which the light emitted by a light source positioned at the camera location is blocked by a surface in the scene at the (x,y) location in the image. The values stored in a depth map specify the distance (depth) from the camera at which a first surface is encountered. Depth maps are generally used for determining shadow effects in rendering a scene and are thus sometimes also referred to as shadow maps. A shadow map is used to determine if a point in a scene is in shadow or not. For example, elements having depth values greater than the given z value at a particular (x,y) image location may be shadowed, whereas elements that have depth values less than the given z value may be lit.

According to an embodiment, a depth map stores information representing a surface comprised of one or more objects. The z-values of the depth map encode the shape of the surface as seen from one angle. A depth map also captures displacement information associated with the one or more objects such as surface information from bumps maps, displacement maps, shader details, etc. that are not available in the surface representation. Depth maps may represent any number of surfaces. Different techniques may be used to generate a depth map. In one embodiment, a depth map is generated by rendering an image of z values of one or more objects captured using a camera. For example, to generate a depth map for a ground surface, a camera positioned in the direction of gravity may be used to capture and render an image of z values that represent the ground surface. In alternative embodiments, some other camera direction may also be used to define the surface represented by the depth map.

According to an embodiment, processing is performed to determine positions and/or orientations of one or more components of an IK controlled animated object relative to a surface object, e.g., represented by a depth map. Initially a target pose of the animated object is received from an animator or other user, and an IK goal of the object is identified. For example, in the case of a foot on a human character, the animator may pose the character proximal the ground or a surface object and identify that the foot or an ankle be locked to the ground or surface object. In certain aspects, the IK goal is moved or posed by an animator either using a direct manipulation tool or using a set of animation control variables to control the degrees of freedom of an object component or point of the object.

Since a depth map stores z-values, the surface (of the ground or surface object) represented by a depth map is a thin surface with no volume. As a result, the IK goal may be either positioned below the surface represented by the depth map, on the surface represented by the depth map, or above the surface represented by the depth map. The determination of the position of a component of an IK controlled animated object with respect to the surface represented by a depth map may be used to update or modify the attributes or state of the animated object. Updating the state of an IK controlled animated object may change one or more of the animated object's geometric and/or non-geometric properties, such as changing the position and/or orientation of a component(s) of the animated object, changing a color associated with the animated object, and the like.

As part of the processing, the position and orientation of the component relative to the surface represented by the depth map is first determined. This may be determined by computing the (x,y) position of the component in the image space of the depth map and comparing the z-value of the component with the z value stored by the depth map for that (x,y) position. This comparison determines whether the component is positioned above the surface represented by the depth map, below the surface, or on the surface. Based upon the position of the component of the IK controlled animated object with respect to the surface, the attributes or state of the animated object may be modified or updated. Updating the state may involve changing geometric and/or non-geometric attributes of the animated object. For example, the state of the animated object may be updated such that the position and/or orientation of the component of the animated object or of other components of the animated object is modified. Non-geometric attributes of the animated object may also be modified such as a color associated with the animated object, etc. In certain aspects, an alignment of the IK component with respect to the surface object is also determined so that the IK component (and/or one or more other components of the object) may be rotated to more accurately match the surface object (e.g., based on the normal of the surface object) orientation where contact is to be made.

For example, a depth map representing a ground surface may be used to update the state of an animated character object walking over the ground surface. In this example, a component of the character object may be a foot. A depth map representing the ground surface may be used to determine if the points of the foot are below the ground surface, above the ground surface, or on the ground surface. Based upon this determination, the transformation matrix of the character object may be positioned and/or oriented to a position and/or orientation desired by the animator. Since the depth map information encapsulates information about the ground terrain (e.g., information about bumps or holes in the ground surface), as the character walks over the ground surface, the position of the component (e.g., foot) and the orientation may be appropriately modified using the depth map such that the foot is positioned and oriented on the ground surface (see, e.g., FIG. 5, to be discussed below, for a 2-dimensional example). This enhances the realism of the animation and makes it appear that the animated object is reactive to the surface.

Figure 2:
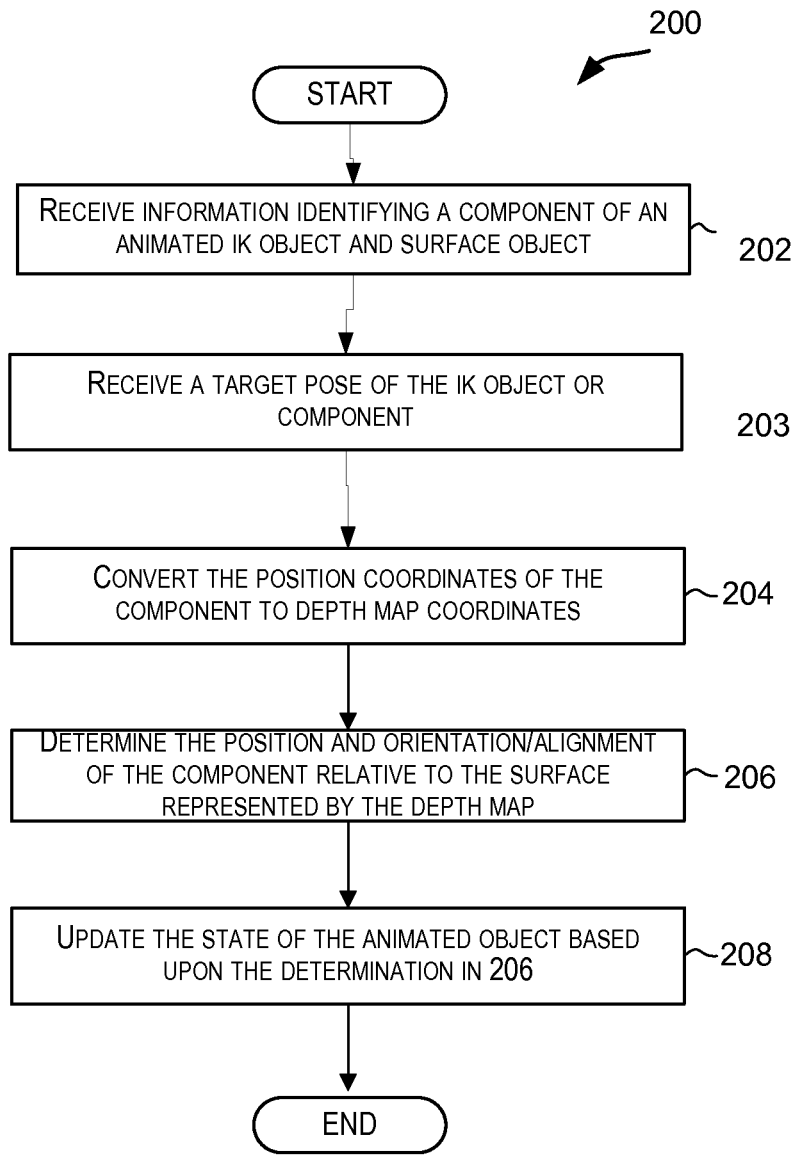
FIG. 2 illustrates a simplified flowchart showing a method of positioning a component of an IK controlled object relative to a surface object according to one embodiment.

FIG. 2 depicts a simplified flowchart 200 showing a method of positioning an IK component relative to a surface object according to one embodiment. The processing depicted in flowchart 200 may be performed by hardware modules, software modules (e.g., code or instructions that may be stored on a computer-readable medium) executed by a processor, or combinations thereof.

Processing is initiated upon receiving information identifying a component of an IK controlled animated object and a surface object in step 202. For example, in certain aspects a specification of the IK controlled object (or of the IK component) and of the surface object is received. The specification typically includes all or a subset of the data that describes the object, including constraints. For example, the specification may include a rigged surface mesh or a skeleton system. The component may be an entire component or a specific point of a component, or any other geometric attribute of the animated object. In certain aspects, receiving information identifying, or a specification of, the surface object includes accessing a depth map representing the surface. The depth map may be a rendering of the z-values representing a surface comprised of one or more objects and including their displacement information. The displacement information encoded by a depth map may include the shape of the surface including shader details, bump maps, displacement maps, etc. associated with the one or more objects. The depth map and the animated object specification may be accessed from a memory location accessible to the animation system. The depth map is typically rendered prior to the animation and is thus typically available prior to step 202.

In step 203 a target pose of an IK component is received. For example, an animator may manipulate or otherwise designate a target pose of the animated object at a specific target image frame. This may be done using a direct manipulation tool or animation control variables that control the IK goal position and orientation. The target pose includes an IK goal for the IK object.

In certain aspects, where depth maps are used, the position coordinates of the IK component are converted to depth map coordinates (the coordinate-space of the camera used to define the depth map) in step 204. This is optional and is done to facilitate calculations using the depth map. Since the depth values in the depth map accessed in 202 are in depth map coordinates, by converting the component coordinates to depth map coordinates, the resultant z-values of the component can be directly compared to z-values in the depth map. In step 206, the position and/or orientation of the IK component relative to the surface object are determined. For example, the position and alignment of the IK component relative to the surface represented by the depth map accessed is determined in step 206. The determination is made based upon the position coordinates of the component and based on depth values stored in the depth map accessed in 204 for that position. In one embodiment, the determination is done by projecting the z coordinates of the component to the z values stored in the depth map corresponding to the (x,y) location of the component.

In one embodiment, the state of the animated object may be updated in 208 to achieve a position and/or orientation of the component (or of other components) of the animated object that is desired by the animator. This may be done to increase the realism of the resultant animation. For example, the state of the target pose of the IK controlled animated object is updated based on the determination made in step 206. Updating the state of an animated object may change one or more of the animated object's geometric and/or non-geometric properties, such as changing the position and/or orientation of a component(s) of the IK controlled animated object, changing a color associated with the animated object, and the like. For example, where a component, such a a foot, includes several subcomponents or children, such as the ball of the foot and the toes, the determination in step 206 may cause the contact point (e.g., ball of foot or toes) to change orientation with respect to other components.

The state of the animated object may also be modified simply to inform the animator of the determined position of the component relative to the surface represented by the depth map. For instance, the color of a foot of a character object may be changed to a particular color (e.g., red) if any of its points are determined to be below the surface represented by the depth map.

Figure 3:
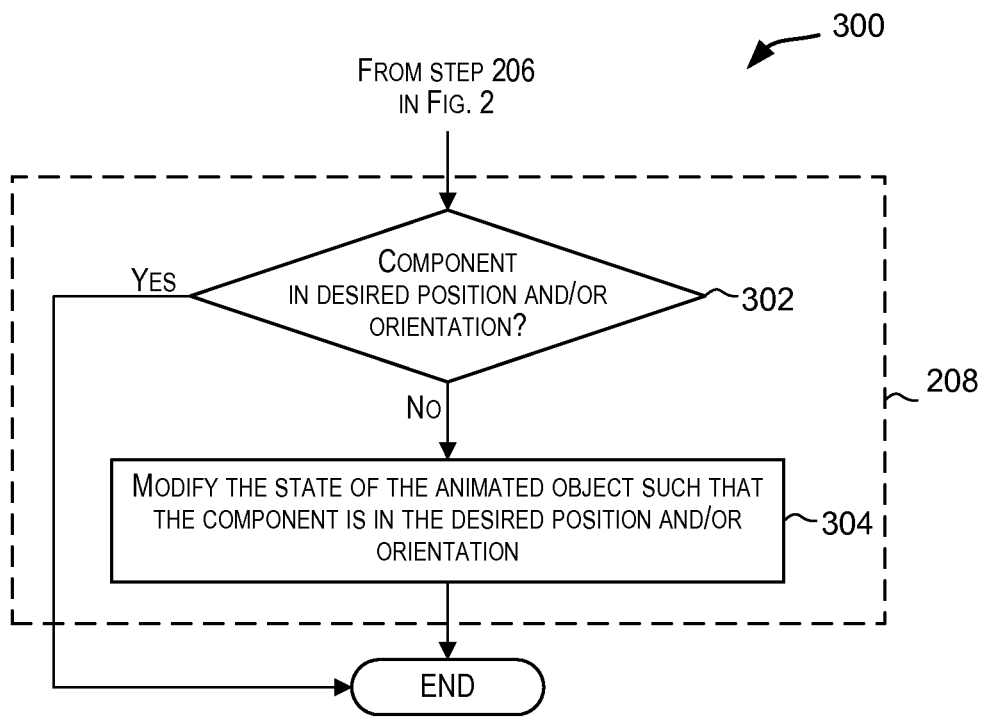
FIG. 3 illustrates a simplified flowchart showing a method for updating the state of an IK controlled animated object.

FIG. 3 depicts a simplified flowchart 300 showing a method for updating the state of an IK controlled animated object to re-position and/or re-orient a component of the animated object to a desired position and/or orientation with respect to a surface object according to one embodiment. As depicted in FIG. 3, upon determining a position and alignment of the component of the animated object relative to the surface object in step 206 of FIG. 2, a check is made to see if the component of the animated object is in a position and/or orientation desired by the animator in step 302. If it is determined in 302 that the component is not in a desired position and/or orientation, then the state of the animated object is changed, e.g., according to method 200, to place the component in the desired position and/or orientation in step 304. In this manner, the state of the animated object is updated to change the position and/or orientation of the component of the animated object. It should be appreciated that re-positioning and re-orienting a component may be done in one, two or three translational degrees of freedom and in one, two or three rotation degrees of freedom.

While the processing depicted in FIGS. 2 and 3 refer to a single component of the IK controlled animated object, in alternative embodiments, the processing may also be applied to multiple components of an IK controlled animated object. The state of the animated object may then be updated based upon the result of the processing of the multiple components. For example, the processing depicted in FIGS. 2 and 3 may be used, for example, to position and/orient components of a character object. In this scenario, the depth map may represent the ground surface, the component of the character object may be one or more feet or other appendages that are supposed to be in contact with a ground surface represented by the depth map. In such a scenario, if it is determined that the points are either above or below the ground surface represented by the depth map, the positions of the points may be changed to place them on the surface represented by the depth map. By doing this, the foot may be "locked" to the surface. As the character changes location over the ground surface (e.g., walks over the ground surface), the depth map representing the ground surface may be used again to determine the position of the relevant points relative to the ground surface and the state of the character object may be updated such that the relevant points are locked to the ground surface whose terrain may change (e.g., hills, holes, bumps, etc.).

Figure 4A:
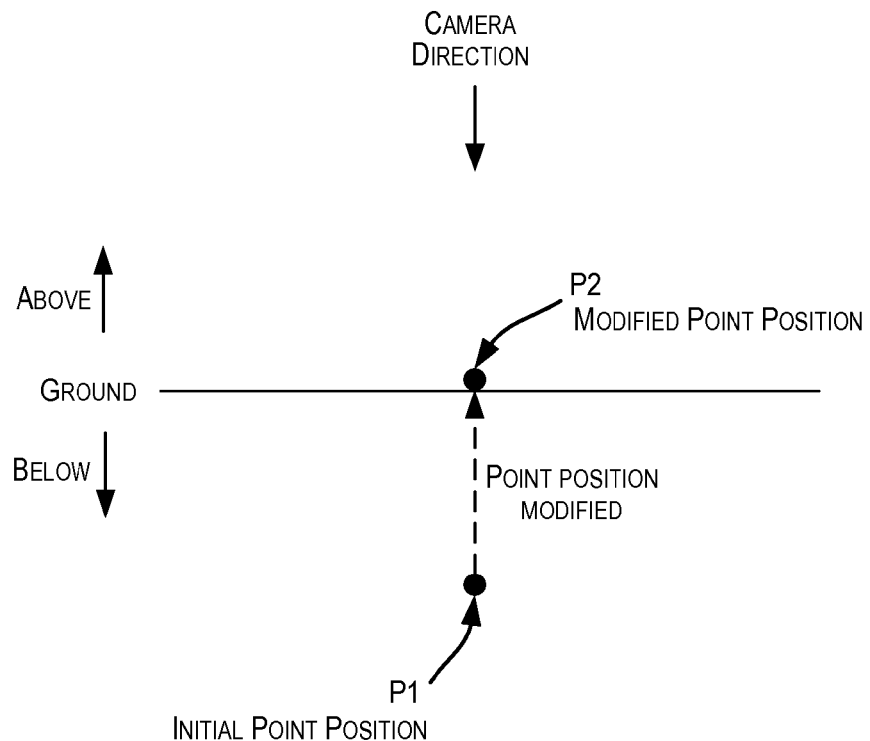
FIGS. 4A and 4B illustrate examples where a (single) point may be modified when initially below, or above, the surface object, respectively.
Figure 4B:
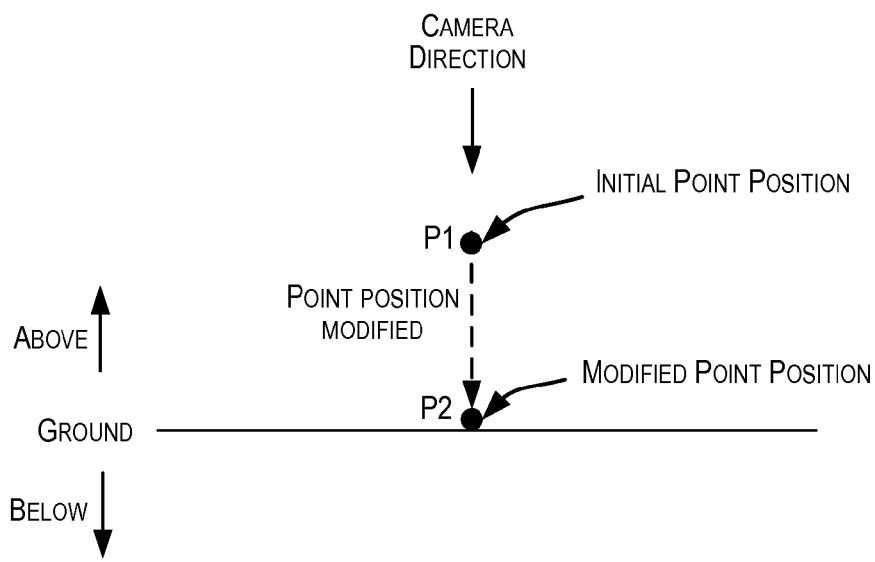

In one embodiment, the degree of the modification needed to make a point or points of an IK component be placed on or near the surface represented by the depth map may be determined by comparing the position of the point or points of the IK component and the value in the depth map corresponding to the point location. In certain aspects, this is done by projecting the point towards the surface such that the modified position and/or orientation of the point or points is placed on the surface. It is assumed for purposes of describing FIGS. 2 and 3 that a point is projected in a direction parallel to the direction of a light source, or as defined by a user. Accordingly, the position of a point of the animated object is modified along a direction that is parallel to the direction of the camera used for rendering the depth map. Projecting a point along the view direction of the camera is equivalent to replacing the z-coordinate of the point in camera space with the z value read from the depth map for the (x,y) coordinates of the point. Thus, the projection is very efficient. The position of the point(s) of the IK component is modified based upon the point's position relative to the surface represented by the depth map. FIGS. 4a and 4b illustrate examples where a (single) point may be modified when initially below, or above, the surface object, respectively.

It should be understood that the desired position of an IK component does not always have to be on the surface. The desired position of the component may be at some location either above or below the surface represented by the depth map and the state of the animated object may be modified accordingly. In one embodiment, a specified distance is maintained within a specified tolerance, e.g., within about 1% to 5%. In another embodiment, the position of the component of the IK controlled animated object is modified to re-position the IK component on the surface if the position of the component is determined to be below or above the surface. For example, a point on the foot of a character object is projected up to the ground surface if it is determined that the point is below the surface.

The position of an IK component relative to the surface represented by a depth map may be used to change the position and/or orientation of other components of the animated object. In one embodiment, where the relative distances between some components of the animated object may stay the same in order to preserve a rigid portion of the animated object, the changes in positions of the other components (e.g., points) of the animated object may be determined based upon the change in position and/or orientation of the IK component whose position is determined relative to the surface.

Figure 5A:
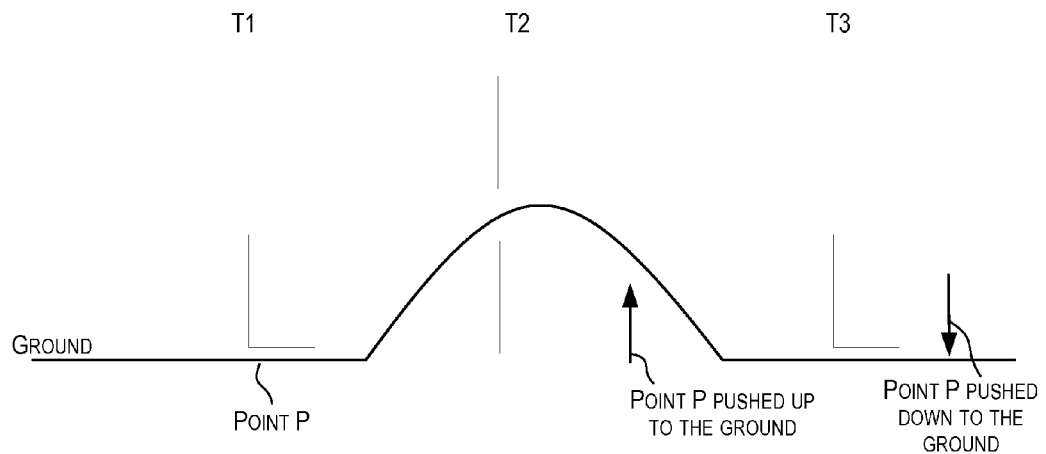
FIGS. 5A and 5B depict pictorial examples of positioning a foot of a character object on a ground surface based on a single point and using a depth map according to one embodiment.
Figure 5B:
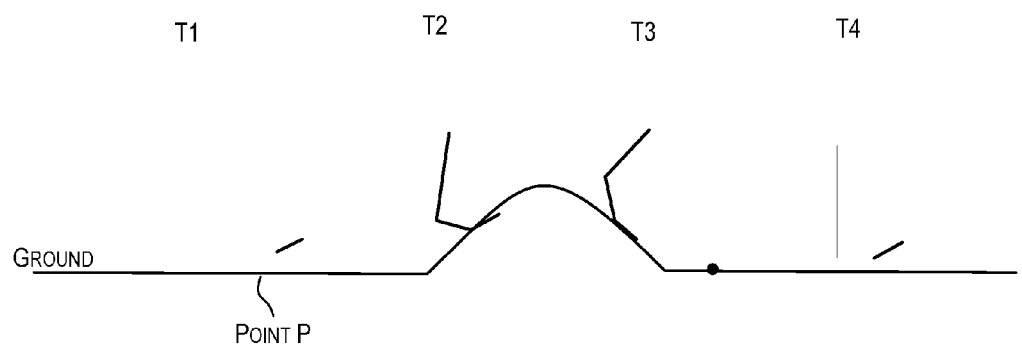

FIGS. 5A and 5B depict 2-dimensional pictorial examples of positioning a foot of a character object on a ground surface based on a single point and using a depth map according to one embodiment. It should be appreciated that the techniques herein are applicable tio 3-dimensional models. In the example depicted in FIG. 5A, at time T1, the state of the foot component is such that the foot is positioned on the surface of the ground and such that a point P of the foot is placed on the ground. At time T2, as the character travels over the ground surface to a new location, a depth map representing the ground surface may be used to determine the position of the foot relative to the ground surface. The terrain or shape of the ground surface at the new location as represented by the depth map may have a bump or hill as depicted in FIG. 5A. Accordingly, at T2, the state of the foot object may be updated such that the position of point P is modified (projected up to the ground surface) such that point P is placed on the ground surface represented by the depth map. The state of the foot object may be modified to update other geometric and/or non-geometric attributes of the character object based upon determination of point P's position relative to the surface repented by the depth map. At time T3, as the character walks over the ground surface to yet another new location, the depth map representing the ground surface may be used again to determine the position of the foot relative to the ground surface. As depicted in FIG. 5A, at the new location, the ground surface as represented by the depth map may be level again (i.e., not have a bump or hill). Accordingly, at T3, upon determining the position of point P relative to the ground surface represented by the depth map, the state of the character animated object may be modified such that the position of point P of the foot is modified (pushed down to the ground surface) to place it on the ground surface. The state of the character object may be modified to update other geometric and/or non-geometric attributes of the character object based upon the determination of point P's position relative to the surface represented by the depth map.

In the example depicted in FIG. 5B, at time T1, the state of the character object is such that the foot is positioned on the ground surface represented by a depth map such that a point P (e.g., ball of foot) of the foot is placed on or near the ground (e.g., foot flat on ground with toe pointing up slightly). Contact with the ground may or may not be made with the foot, ball or toes, where present. At T2, as the character walks to a new location, the depth map representing the ground surface may be used to determine the position of the point relative to the ground surface. The terrain of the ground surface at the new location as represented by a depth map may have a front side of a bump as depicted in FIG. 5B. Accordingly, at T2, the state of the character object is modified such that point P is placed on or near (e.g., within a tolerance) the ground surface with the ball of the foot rotated (e.g., the toe is tangential to surface). The state of the character object may be further modified to update one or more other geometric or non-geometric attributes, such as to change the orientation of the foot as depicted in FIG. 5B. At time T3, the character travels to yet another new location. At this new location, the ground surface as represented by the depth map may have a backside of a bump. At T3, the position of point P is determined relative to the ground surface using the depth map representing the ground surface. The state of the character object may be updated such that point P is pushed near to the ground surface (as shown, the ball is rotated slightly so that the toe is tangential to the surface). The state of the character object may be further modified to update one or more other geometric or non-geometric attributes, such as to change the orientation of the foot as depicted in FIG. 5B. At time T4, the character travels to yet another new location. At this new location, the ground surface as represented by the depth map may be level again (i.e., not have a bump or hill). Accordingly, at T4, the position of point P is determined relative to the ground surface using the depth map representing the ground surface. The state of the character object may be updated such that point P is placed on the ground surface (the toe is pointing up slightly). The state of the character object may be further modified to update one or more other geometric or non-geometric attributes of the character object.

In one embodiment, to re-position and align the object multiple points are used. For example, for a foot object, a set of discrete points on the sole of the foot are sampled. These sample points estimate the shape of the sole and the distance from the sole to the IK target (e.g., ankle) point. After computing the current state, the system projects each deformed sample point onto the ground surface. In certain aspects, depth map projection technology is used for ground plane generation and ground projection. To compute the orientation coordinate frame, the furthest projected points at the toe and heel are used to determine the y-direction of the frame, and the furthest left and right points are used to determine the x-direction. Once the foot is oriented properly, its displacement is computed. To accomplish this, the rotated sample points are projected to the ground again, sample point whose projection has the greatest displacement is chosen, and this displacement is used to translate the IK target (the ankle) Thereafter, the system deforms the foot to reflect how it is pushed against the ground. The system also allows users to morph from the initial foot rotation to the ground rotation smoothly, by interpolating between the initial rotation matrix and final rotation matrix.

In this manner, the state of the character object is updated such that the resultant position of the foot component(s) is such that the foot of the character is glued or locked to the ground surface (i.e., are positioned on the ground surface) for different ground terrains and the contact of the foot is oriented on the ground surface as desired. If the character walks over varying terrain, then the position and orientation of the character is also modified such that the foot is placed on or near the ground surface. Accordingly, the position and orientation of the foot changes responsive to or reactive to changes in the ground terrain as encoded in the depth map representing the ground, thereby making the resultant animation look more realistic. For a character with multiple feet, each foot of the character may be locked to the ground independently using the techniques described above.

IK Solver and UI

As an example, for a human object model, three joints at the hip, knee, and ankle are controlled by a two-segment IK solver. The animator chooses a target position for the ankle, which determines the foot position. The ideal solver would maximize the contact area between the two irregular rigid surfaces (the foot and the ground) by simultaneously solving for the translation and rotation of the foot; but this problem has no analytical solution. To keep the solver fast and analytical, the rotation and translation calculations are decoupled in one embodiment. The solution is approximate, but is close enough to the ideal solution that it provides a useful guideline, while it keeps the system fast and history-free.

In one embodiment, the ground locking computation is implemented as a controller, which outputs a set of values that can be written to existing animation controls such as "Foot IK Translate" $T_x$, $T_y$, $T_z$ and "Foot Rotate" $R_x$, $R_y$, $R_z$. These animation control variables may be stored or cached for later use and they may also be exported for use by another image processing application. To keep the user interface simple and intuitive in certain aspects, a translation direct manipulation widget is provided to translate, rotate, and deform the foot against the ground. When the foot hits the ground surface, the foot stops. As the animator pulls the widget further below the ground, the foot is rotated smoothly and eventually aligns with the surface. If he/she pulls the widget even further, the foot starts being squashed. Once the animator is satisfied with the look, he/she releases the widget, and all the translation and rotation values are recorded. He/she may tweak the values in the attribute editors or spline editors afterwards.

System Components

Figure 6:
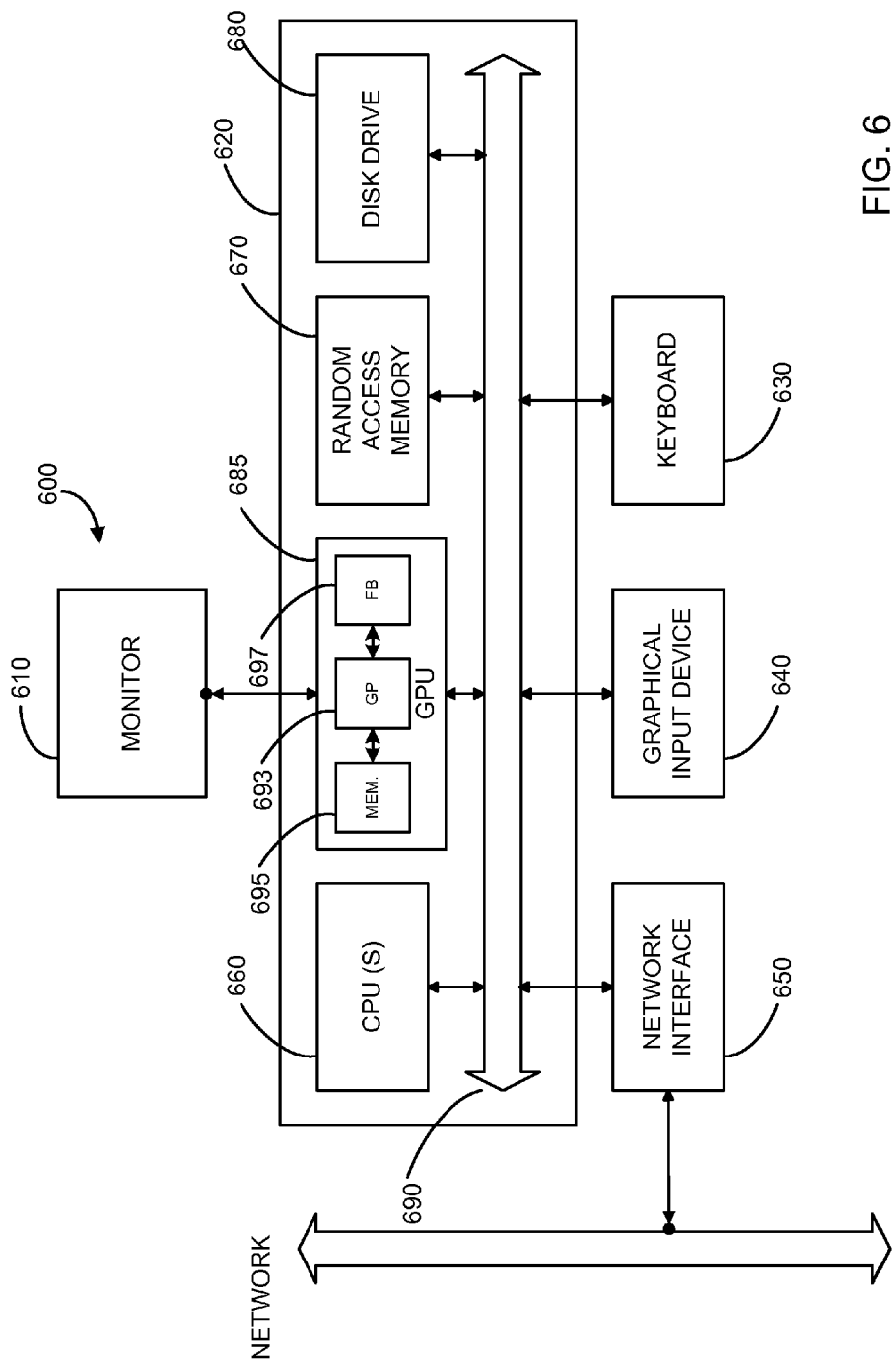
FIG. 6 is a block diagram of a computer system that may be used to practice various embodiments.

FIG. 6 is a block diagram of a computer system that may be used to practice various embodiments. FIG. 6 is merely illustrative of an embodiment incorporating the present invention and does not limit the scope of the invention as recited in the claims. One of ordinary skill in the art would recognize other variations, modifications, and alternatives.

In one embodiment, computer system 600 typically includes a monitor 610, computer 620, a keyboard 630, a user input device 640, computer interfaces 650, and the like.

In various embodiments, user input device 640 is typically embodied as a computer mouse, a trackball, a track pad, a joystick, wireless remote, drawing tablet, voice command system, eye tracking system, and the like. User input device 640 typically allows a user to select objects, icons, text and the like that appear on the monitor 610 via a command such as a click of a button or the like.

Embodiments of computer interfaces 650 typically include an Ethernet card, a modem (telephone, satellite, cable, ISDN), (asynchronous) digital subscriber line (DSL) unit, FireWire interface, USB interface, and the like. For example, computer interfaces 650 may be coupled to a computer network, to a FireWire bus, or the like. In other embodiments, computer interfaces 650 may be physically integrated on the motherboard of computer 620, and may be a software program, such as soft DSL, or the like.

In various embodiments, computer 620 typically includes familiar computer components such as a processor 660, and memory storage devices, such as a random access memory (RAM) 670, disk drives 680, a GPU 685, and system bus 690 interconnecting the above components.

In some embodiment, computer 620 includes one or more Xeon microprocessors from Intel. Further, one embodiment, computer 620 includes a UNIX-based operating system.

RAM 670 and disk drive 680 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 685 may be any conventional graphics processing unit that may be user programmable. Such GPUs are available from NVIDIA, ATI, and other vendors. In this example, GPU 685 includes a graphics processor 693, a number of memories and/or registers 695, and a number of frame buffers 697.

FIG. 6 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of positioning an inverse kinematics (IK) controlled object relative to a surface, the method comprising:

receiving, at one or more computer systems, information identifying specification of an IK object having a set of IK object parameters;

receiving, at the one or more computer systems, information identifying a surface;

receiving, at the one or more computer systems, information identifying a first pose associated with the IK object, the first pose having an IK goal for the IK object reflected in a first set of values for the set of IK object parameters;

determining, with one or more processors associated with the one or more computer systems, position and orientation of a component of the IK object relative to the surface determining, with the one or more processors associated with the one or more computer systems, a second set of values for the set of IK object parameters based on the determined position and orientation of the component of the IK object; and generating, with the one or more processors associated with the one or more computer systems, information indicative of a second pose of the IK object based on the second set of values for the set of IK objects parameters.

2. The method of claim 1, wherein receiving the information identifying specification of the comprises receiving a depth map representing the surface.

3. The method of claim 2, wherein determining the position and orientation of the component of the IK object relative to the surface comprises determining difference values between the surface and one or more points of the component based on the depth map.

4. The method of claim 1, wherein the IK controlled object is a physical object.

5. The method of claim 1, wherein generating the information indicative of the second pose of the IK object comprises modifying of the IK goal of the first pose of the IK object, modifying the position of the component of the IK object, or modifying the orientation of the component of the IK object.

6. The method of claim 5, wherein the IK goal, the position of the component of the IK object, or the orientation of the component of the IK object are modified such that the component of the IK object lies in a plane associated with the surface.

7. The method of claim 1, wherein the IK object is an animated character, and wherein the component of the IK object is a foot of the animated character and wherein the foot is re-oriented relative to the surface based on the information indicative of the second pose of the IK object.

8. The method of claim 1, wherein determining the second set of values for the set of IK object parameters comprises one or both of determining a translation amount for translating the IK goal along one or more directions and determining a rotation amount for rotating one or more points representing the component of the IK object about one or more rotation axes centered on the IK goal.

9. The method of claim 1, wherein receiving the information identifying the IK object includes receiving a specification of an initial pose of the IK object as the first pose, and wherein determining the position and orientation of the component of the IK object relative to the surface includes projecting the initial pose of the IK object onto the surface to determine a rotation around the IK goal for points representing the component of the IK object.

10. The method of claim 9, further including receiving a projection direction for projecting the initial pose of the IK object onto the surface.

11. The method of claim 9, wherein the rotation comprises at least two degrees of freedom.

12. The method of claim 1, wherein the IK controlled object is an animated object used in an animation system.

13. The method of claim 12, further comprising rendering one or more images including the animated object and the surface, wherein in the one or more images the IK component maintains a specified distance from the surface within a specified tolerance.

14. The method of claim 1, further including using an image display system to display an image of the IK object based on the information indicative of the second pose of the IK object.

15. The method of claim 1, wherein the second set of values for the set of IK object parameters are stored or cached for later use.

16. A non-transitory computer readable medium storing code which when executed by one or more processors causes the one or more processors to position an object relative to a surface the non-transitory computer readable medium comprising:
    code for receiving information identifying of an IK object having a set of IK object parameters;
    code for receiving information identifying a surface;
    code for receiving information identifying a first pose of the IK object, the first object having an IK goal reflected in a first set of values for the set of IK object parameters;
    code for determining position and orientation of a component of the IK object relative to the surface;
    code for determining a second set of values for the set of IK object parameters based on the determined position and orientation of the component of the IK object; and
    code for generating information indicative of a second pose of the IK object based on the second set of values for the set of IK object parameters.

17. The non-transitory computer readable medium of claim 16, wherein the code for receiving the information indicative of the surface comprise code for accessing a depth map representing the surface.

18. The non-transitory computer readable medium of claim 17, wherein the code for determining the position and orientation of the component of the IK object relative to the surface comprises code for determining difference values between the surface and one or more points of the component using the depth map.

19. The non-transitory computer readable medium of claim 16, wherein the code for determining the second set of values for the set of IK object parameters comprises code for one or both of determining a translation amount for translating the IK goal along one or more directions and determining a rotation amount for rotating one or more points representing the component of the IK object about one or more rotation axes centered on the IK goal.

20. The non-transitory computer readable medium of claim 16, wherein the code for receiving the information identifying of the IK object includes receiving a specification of an initial pose of the IK object as the first pose, and wherein the code for determining position and orientation of the component of the IK object comprises code for projecting the initial pose of the IK object onto the surface to determine a rotation around the IK goal for points representing the component of the IK object.

21. The non-transitory computer readable medium of claim 16, wherein the IK object is an animated object used in an animation system.

22. The non-transitory computer readable medium of claim 21, further comprising code for rendering one or more images including the animated object and the surface object, wherein in the one or more images the IK component maintains a specified distance from the surface within a specified tolerance.

23. The non-transitory computer readable medium of claim 16, further comprising code for displaying an image of the IK object based on the information indicative of the second pose of the IK object.

24. A system for positioning an inverse kinematics (IK) controlled object relative to a surface, the system comprising:
    one or more processors; and a memory storing a set of instructions which when executed by the one or more processors cause the one or more processors to: receive information identifying an IK object having a set of IK object parameters; receive information identifying a surface; receive information identifying a first pose associated with the IK object, the tar-ge4 first pose having an IK goal for the IK object reflected in a first set of values for the set of IK object parameters; determine position and orientation of a component of the IK object relative to the surface; determine a second set of values for the set of IK object parameters based on the determined position and orientation of the component of the IK object; and generate information indicative of the a second pose of the IK object based on the second set of values for the set of IK objects parameters.

25. The system of claim 24, further comprising a display module for displaying one or more images of the IK object.

26. The system of claim 25, wherein the one or more processors are caused to display an image of the IK object on the display module based on the information indicative of the second pose of the IK object.

27. The system of claim 25, wherein the IK object is an animated object used in an animation system, and wherein the one or more processors are caused to render one or more images on the display module including the animated object and the surface, wherein in the one or more images the IK component maintains a specified distance from the surface within a specified tolerance.

28. The system of claim 24, wherein to generate the information indicative of the second pose of the IK object the one or more processors are caused to modify of the IK goal of the first pose of the IK object, to modify the position of the component of the IK object, or to modify the orientation of the component of the IK object.

29. The system of claim 28, wherein the IK goal, the position of the component of the IK object, or the orientation of the component of the IK object are modified such that the component of the IK object lies of in a plane associated with the surface.

30. The system of claim 24, wherein to receive the information identifying of the surface the one or more processors are caused to receive a depth map representing the surface, and wherein to determine the position and orientation of the component of the IK object the one or more processors are caused to determine difference values between the surface and one or more points of the component of the IK object using the depth map.

31. The system of claim 24, wherein to receive the information identifying of the IK object the one or more processors are caused to receive a specification of an initial pose of the IK object as the first pose, and wherein to determine the position and orientation of the component of the IK object the one or more processors are caused to project the initial pose of the IK object onto the surface to determine a rotation around the IK goal for points representing the component of the IK object.

* * * * *